(12) United States Patent
Morimoto

(10) Patent No.: US 8,395,311 B2
(45) Date of Patent: Mar. 12, 2013

(54) LIGHT EMITTING APPARATUS, LIGHTING DEVICE AND LIQUID CRYSTAL DISPLAY APPARATUS

(75) Inventor: Taiji Morimoto, Onomichi (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 611 days.

(21) Appl. No.: 12/119,823

(22) Filed: May 13, 2008

(65) Prior Publication Data

US 2009/0002604 A1    Jan. 1, 2009

(30) Foreign Application Priority Data

May 14, 2007 (JP) .................................. 2007-128660

(51) Int. Cl.
*F21V 9/16* (2006.01)
*G02F 1/1335* (2006.01)

(52) U.S. Cl. .......... 313/500; 313/507; 313/512; 445/24; 445/25

(58) Field of Classification Search .................. 313/512, 313/500
See application file for complete search history.

(56) References Cited

U.S. PATENT DOCUMENTS

| | | | |
|---|---|---|---|
| 5,569,983 A * | 10/1996 | McGuire et al. .............. | 315/297 |
| 6,411,046 B1 | 6/2002 | Muthu | |
| 6,596,195 B2 * | 7/2003 | Srivastava et al. ..... | 252/301.4 R |
| 7,404,652 B2 | 7/2008 | Ng et al. | |
| 7,656,371 B2 | 2/2010 | Shimizu et al. | |
| 7,965,031 B2 | 6/2011 | Brunner et al. | |
| 2003/0155856 A1 * | 8/2003 | Shiiki et al. .................... | 313/483 |
| 2004/0264193 A1 | 12/2004 | Okumura | |
| 2005/0184638 A1 | 8/2005 | Mueller et al. | |
| 2006/0152172 A9 * | 7/2006 | Mueller et al. ............... | 315/291 |
| 2006/0214578 A1 * | 9/2006 | Iwanaga et al. ............... | 313/512 |
| 2006/0289878 A1 * | 12/2006 | Brunner et al. ................ | 257/89 |
| 2007/0007494 A1 * | 1/2007 | Hirosaki et al. ....... | 252/301.4 R |
| 2007/0120496 A1 | 5/2007 | Shimizu et al. | |
| 2009/0140630 A1 | 6/2009 | Kijima et al. | |

FOREIGN PATENT DOCUMENTS

| | | |
|---|---|---|
| CN | 1443304 | 9/2003 |
| JP | 2004-253309 | 9/2004 |
| JP | 2006-173286 | 6/2006 |
| JP | 2006-173622 | 6/2006 |
| JP | 2006-309209 | 11/2006 |
| JP | 2007-507096 | 3/2007 |
| WO | WO-03/019072 | 3/2003 |

(Continued)

OTHER PUBLICATIONS

CIE Diagram, http://hyperphysics.phy-astr.gsu.edu/hbase/vision/cie.html, Oct. 2000, web-page.*

(Continued)

*Primary Examiner* — Tracie Y Green
(74) *Attorney, Agent, or Firm* — Morrison & Foerster LLP

(57) ABSTRACT

A light emitting apparatus is described. The apparatus includes a light emitting section having a plurality of light sources, the plurality of light sources each including a semiconductor light emitting element and one or more types of phosphors for performing a wavelength conversion on a portion of light outputted from the semiconductor light emitting element to radiate fluorescence, and the plurality of light sources each emitting light of different colors; and a light emitting control section for controlling emission intensity of each of the plurality of light sources to control a color temperature of a combined light emitted from the plurality of light sources.

34 Claims, 9 Drawing Sheets

FOREIGN PATENT DOCUMENTS

| WO | WO-2005/011006 | 2/2005 |
| WO | WO-2005/031797 | 4/2005 |
| WO | WO 2006118389 A1 * | 11/2006 |
| WO | WO 2007114614 A1 * | 10/2007 |

OTHER PUBLICATIONS

Office Action dated Mar. 30, 2012, directed to Japanese Application No. 2007-128660; 2 pages.

Office Action mailed Oct. 30, 2012, directed to Japanese Application No. 2007-128660; 3 pages.

Chinese First Office Action mailed Apr. 21, 2011, directed to counterpart Chinese Patent Application No. 200810099515.6; 17 pages.

Japanese Office Action mailed Oct. 17, 2011, directed to counterpart Japanese Application No. 2007-128660; 3 pages.

* cited by examiner

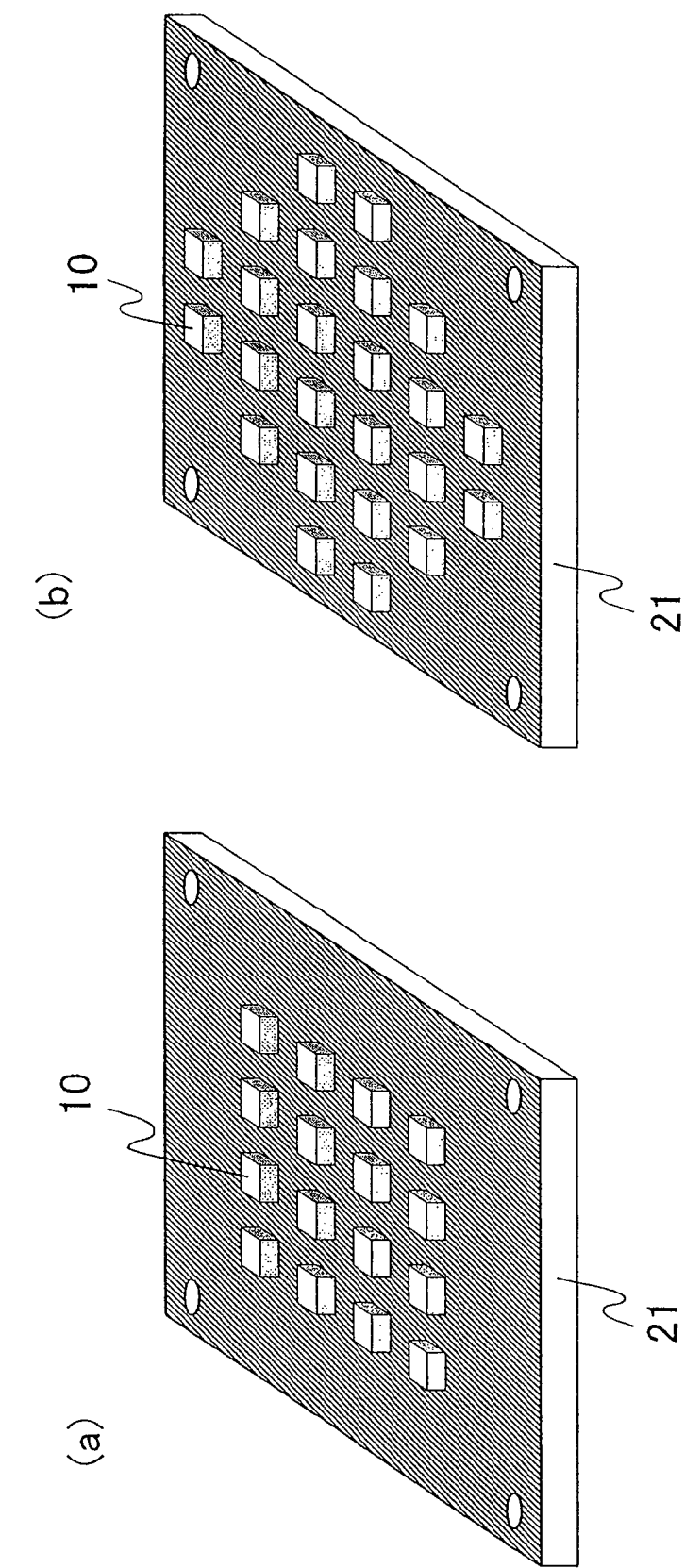

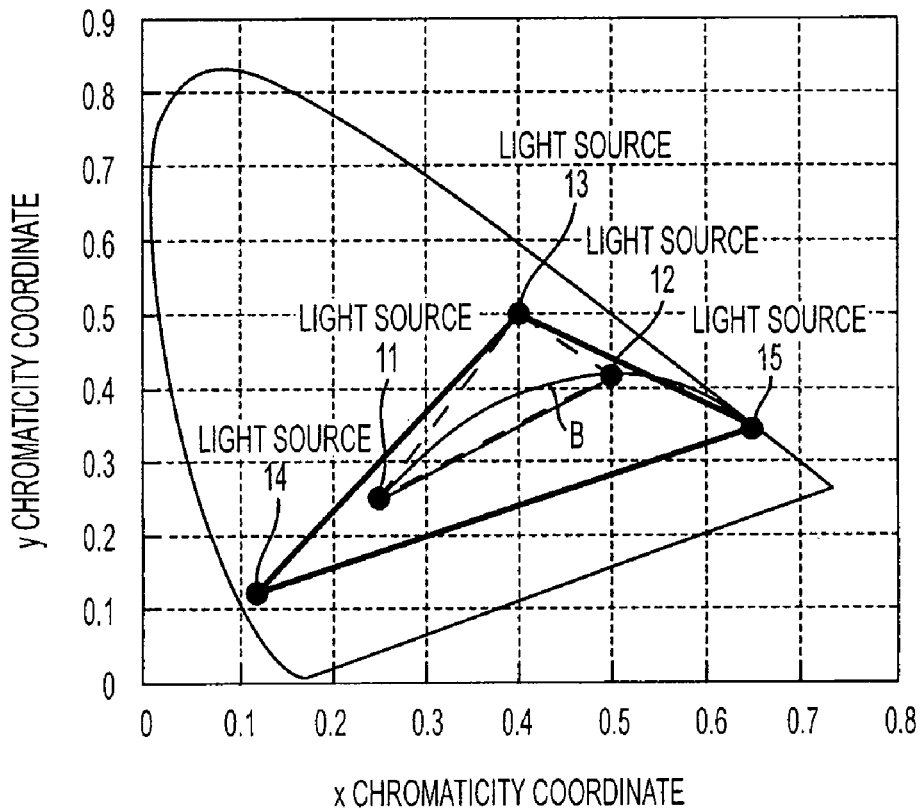

| CHROMATICITY COORDINATE | | |
|---|---|---|
| | X | Y |
| BLUE COLOR LED | 0.152 | 0.025 |
| GREEN COLOR LED | 0.194 | 0.725 |
| RED COLOR LED | 0.696 | 0.304 |

LIGHT EMITTING APPARATUS, LIGHTING DEVICE AND LIQUID CRYSTAL DISPLAY APPARATUS

This Nonprovisional Application claims priority under 35 U.S.C. §119(a) on Patent Application No. 2007-128660 filed in Japan on May 14, 2007, the entire contents of which are hereby incorporated by reference.

BACKGROUND OF THE INVENTION

1. Field of the Invention

The present invention relates to a light emitting apparatus that enables light emitting, such as white light, using a semiconductor light emitting diode (LED) element and a phosphor that changes a wavelength of output light from the light emitting diode (LED) element; a lighting device using the light emitting apparatus as a light source; and a liquid crystal display apparatus using the light emitting apparatus as a backlight.

2. Description of the Related Art

A conventional light emitting apparatus, such as a lighting device, using a semiconductor light emitting diode (LED) element has been used for various purposes. A light emitting apparatus capable of having more color rendering properties and emitting more natural white light is in need. In particular, the emission of white light adjusted to the path of black body radiation is known to provide people a visual sense of security and have a calming effect to provide people a sense of serenity.

For example, Reference 1 discloses an LED lighting apparatus that includes a light emitting portion having a red LED, a blue LED and a green LED, and a light receiving sensor for measuring light outputted from the light emitting portion. The LED lighting apparatus obtains white light by adjusting driving current value provided to respective LEDs so that the LED lighting apparatus obtains a predetermined white balance, such as white color on the path of black body radiation (black body radiation locus), based on a measured value from the light receiving sensor.

FIG. 8 is a table showing emission spectra of a blue LED, a green LED and a red LED.

As can be seen from FIG. 8, the emission of each of the three primary color LEDs of blue, green and red is narrow in the half width and high in color purity. Therefore, there is a significantly dark wavelength region in white light by the emission of the three primary color LEDs because there are valleys between the emission spectra of the blue LED and the green LED, and between the emission spectra of the green LED and the red LED.

FIG. 9 is a diagram showing the chromaticity coordinates of each of the three primary color LEDs so as to obtain white light.

As shown in FIG. 9, the chromaticity coordinates (x, y) of the blue LED are (0.152, 0.025), for example; and the chromaticity coordinates (x, y) of the green LED are (0.194, 0.725), for example; and the chromaticity coordinates (x, y) of the red LED are (0.696, 0.304), for example, in order to obtain white light.

FIG. 10 is a CIE 1931 chromaticity diagram showing the chromaticity coordinates of the respective color LEDs in FIG. 9 to obtain white light, the chromaticity diagram explaining the relationship between the emission of the blue, green and red LEDs and the black body radiation locus.

In FIG. 10, the emission of the three primary color LEDs is plotted in the CIE 1931 chromaticity diagram using the chromaticity coordinates shown in FIG. 9, and emission intensity for respective colors is adjusted to generate colors inside the triangle formed by the respective three color LEDs. In addition, as can be seen in FIG. 10, the emission of the respective LEDs also extends to the perimeter of the CIE 1931 chromaticity diagram, thereby generating a wide range of colors. Making the most of this characteristic, LEDs are employed for a variety of display devices, such as a backlight for a liquid crystal display apparatus.

Further, Reference 2 discloses a white light LED that includes a blue LED and two types of phosphors as encapsulating resins for the blue LED. The wavelength of the emitted light from the blue LED is converted by the phosphors, so that this white light LED obtains a white light with a color temperature of 2300 K to 7000 k.

Reference 1: Japanese Laid-Open Publication No. 2004-253309

Reference 2: Japanese Laid-Open Publication No. 2007-507096

SUMMARY OF THE INVENTION

The conventional technique described above, however, has problems described below.

The conventional LED lighting apparatus described above makes the emission of white light possible by using three types of LEDs, namely a red color LED, a blue color LED, a green color LED. However, as shown in FIG. 8, the LEDS of respective colors have narrow emission spectra width (half width or full width at half maximum, which represents the degree of extension). Even if white color is expressed by combining the LEDs of the three primary colors, some wavelength regions with weak light intensity exist. As a result, a problem arises where sufficient color rendering properties are not maintained.

For example, blue light and green light are recognized as a sky blue when entering a human eye. A true sky blue, such as light near 490 nm, is located at a valley in between the emission spectrum of the blue color LED and the emission spectrum of the green color LED in the white light emitted by the three types of the LEDs, and only weak emission of light exists as shown in FIG. 8. Assume there is an object that reflects only light near 490 nm and absorbs all the light of other colors. When this object is radiated by white light produced by using the three types of LEDs shown in FIG. 9, a blue color and a green color are absorbed by the object, and therefore light will be hardly reflected, thereby changing the color of the object. When there is such a wavelength region where only weak emission exists, the true color of the radiated object will not be reproduced by the reflected light, which leads to poor color rendering properties. Accordingly, if such a light is used for a lighting device, a problem arises that the light will be a light source of poor color rendering properties.

FIG. 11 is a diagram showing the change of the average color rendering index (Ra) when the color temperature is changed from 2500 k to 7000 k with regard to the emission of the white light by using the three color LEDs.

As shown in FIG. 11 with regard to the LED, the value for the average color rendering index (Ra) varies no greater than the value of 45. Considering that the average color rendering index (Ra) for a three-wavelength fluorescent lamp is about 70, it is recognized that the value for the LED is significantly low.

The LED lighting apparatus 100 disclosed in Reference 1 uses LEDs of the three primary colors. However, three types of the LEDs each have different characteristics, and therefore an LED driving circuit (control circuit 102) needs to be optimized in accordance with LED characteristics for respective colors. For example, the driving voltage is different for a red color (R) LED, a blue color (B) LED and a green color (G) LED respectively, and each LED in the light emitting apparatus as a whole needs to be driven at an optimized state.

In addition, a red color LED changes the characteristics as its temperature changes. Specifically, the wavelength of a red color emitted has a characteristic to become longer as the temperature rises. This corresponds to the direction of the wavelength that weakens the sensitivity of the human eye, and as a result, a person will recognize the red light to be darker. Further, the LED has a characteristic that its emission efficiency decreases as the temperature rises. Due to the two factors, the red light is recognized to be darker by the human eye if the temperature rises. Therefore, in order to compensate for the darkness, the amount of current to the LED needs to be increased. However, increasing the amount of current causes the heat generated in the LED to increase, leading to the problem of unreliability.

Moreover, the green LED is significantly affected by a problem of piezoelectric effect. The piezoelectric effect is a phenomenon that an emission wavelength depends on the amount of current and turns to be a short wavelength up to certain current, and after its saturation, turns to be a longer wavelength due to an increased temperature. The piezoelectric effect is a characteristic that can be found in gallium nitride LED. Such a characteristic is also found in the blue color LED, although the wavelength change is rather small in the blue color LED, causing no significant problem. However, the wavelength change in the green color LED is large, causing its color to change. In order to suppress the wavelength change, a PWM driving method, for example, is employed. The PWM driving method keeps a constant peak current and changes a pulse width to adjust the brightness of light. According to this driving method, it is possible to adjust the brightness without causing a wavelength change; however it has a problem to make the driving circuit complicated.

Further, although the conventional white light emitting LED disclosed in Reference 2 described above is a white color LED chip capable of emitting white light that is used in the color temperature in the range of 2300 k-7000 k, it is necessary to use a large number of such LEDs for a light emitting apparatus that is used for a lighting purpose since such a lighting apparatus needs sufficient amount of light. In this case, there is a possibility of color irregularities due to the variation of the brightness of each LED. Further, for a light emitting apparatus using a plurality of the white color LED chips, color components of the three primary colors cannot be controlled individually, and therefore the light emitting apparatus is not capable of changing the color temperature along the path of the black body radiation or emitting light of other colors.

The present invention is intended to solve the conventional problems described above. The objective of the present invention is to provide a light emitting apparatus that has good color rendering properties and is capable of emitting white light and light of other colors by changing the color temperature along the path of the black body radiation without the need of the complicated driving methods, such as the PWM driving method; a lighting device that uses the light emitting apparatus as a light source; and a liquid crystal display apparatus that uses the light emitting apparatus as a backlight.

A light emitting apparatus according to the present invention includes a light emitting section having a plurality of light sources, the plurality of light sources each including a semiconductor light emitting element and one or more types of phosphors for performing a wavelength conversion on a portion of light outputted from the semiconductor light emitting element to radiate fluorescence, and the plurality of light sources each emitting light of different colors; and a light emitting control section for controlling emission intensity of each of the plurality of light sources to control a color temperature of a combined light emitted from the plurality of light sources.

Preferably, in a light emitting apparatus according to the present invention, the one or more types of phosphors radiate fluorescence having a wavelength of at least any one of green, yellow and red colors above the semiconductor light emitting element that outputs light having a wavelength of a blue color.

Still preferably, a light emitting apparatus according to the present invention further includes at lease two types of light sources as the plurality of light sources, wherein the light emitting control section controls driving current for the at least two types of light sources and changes a light emitting ratio for the at least two types of light sources to change a color temperature of the combined light.

Still preferably, in a light emitting apparatus according to the present invention, the light emitting section includes the at least two types of light sources and an adjusting third light source, and the light emitting control section controls the driving current and changes the light emitting ratio for each light source to change a range of the color temperature within which the combined light can be emitted.

Still preferably, in a light emitting apparatus according to the present invention, the adjusting third light source is either a light source of a single semiconductor light emitting element or a light source having a semiconductor light emitting element and a phosphor for performing a wavelength conversion of light emitted from the semiconductor light emitting element.

Still preferably, a light emitting apparatus according to the present invention further includes a light source having a phosphor that radiates fluorescence at a yellow color wavelength as a first light source of the plurality of light sources above a semiconductor light emitting element that outputs light having a wavelength of a blue color; and a light source having a phosphor that radiates fluorescence at a yellow color wavelength and a phosphor that radiates fluorescence at a red color wavelength as a second light source of the plurality of light sources above a semiconductor light emitting element that outputs light having a wavelength of a blue color.

Still preferably, a light emitting apparatus according to the present invention further includes a light source having a phosphor that radiates fluorescence at a green color wavelength and a phosphor that radiates fluorescence at a red color wavelength as a first light source of the plurality of light sources above a semiconductor light emitting element that outputs light having a wavelength of a blue color; and a light source having a phosphor that radiates fluorescence at a yellow color wavelength and a phosphor that radiates fluorescence at a red color wavelength as a second light source of the plurality of light sources above a semiconductor light emitting element that outputs light having a wavelength of a blue color.

Still preferably, a light emitting apparatus according to the present invention further includes a light source having a phosphor that radiates fluorescence at a green color wavelength and a phosphor that radiates fluorescence at a red color wavelength as a first light source of the plurality of light sources above a semiconductor light emitting element that outputs light having a wavelength of a blue color; a light source having a phosphor that radiates fluorescence at a yellow color wavelength and a phosphor that radiates fluorescence at a red color wavelength as a second light source of the plurality of light sources above a semiconductor light emitting element that outputs light having a wavelength of a blue color; and a light source having a phosphor that radiates fluorescence at a green color wavelength as the adjusting third light source above a semiconductor light emitting element that outputs light having a wavelength of a blue color.

Still preferably, a light emitting apparatus according to the present invention further includes a light source having a phosphor that radiates fluorescence at a green color wavelength as a first light source of the plurality of light sources above a semiconductor light emitting element that outputs light having a wavelength of a blue color; a light source having a phosphor that radiates fluorescence at a red color wavelength as a second light source of the plurality of light sources above a semiconductor light emitting element that outputs light having a wavelength of a blue color; and a light source having a semiconductor light emitting element that outputs light having a wavelength of a blue color as the adjusting third light source.

Still preferably, a light emitting apparatus according to the present invention further includes a fourth light source of the plurality of light sources, the fourth light source having a phosphor that radiates fluorescence at a red color wavelength above a semiconductor light emitting element that outputs light having a wavelength of a blue color.

Still preferably, in a light emitting apparatus according to the present invention, a range of a color temperature desired to be changed on a black body radiation locus is included in a triangle formed by the first light source, the second light source and the third light source.

Still preferably, in a light emitting apparatus according to the present invention, and in a case where a range of a color temperature desired to be changed on a black body radiation locus cannot be included in a triangle formed by the first light source, the second light source and the third light source, a forth light source is provided so that the range of a color temperature desired to be changed on a black body radiation locus is included in a quadrilateral formed by the four light sources.

Still preferably, a light emitting apparatus according to the present invention further includes one or more types of other colors of light sources so as to extend a variable range of the color temperature.

Still preferably, in a light emitting apparatus according to the present invention, the other colors of light sources are light sources for high color temperature extension and/or low color temperature extension.

Still preferably, in a light emitting apparatus according to the present invention, the semiconductor light emitting element is a semiconductor light emitting diode element.

Still preferably, in a light emitting apparatus according to the present invention, the semiconductor light emitting element for a blue color is an InGaN semiconductor light emitting diode element.

Still preferably, in a light emitting apparatus according to the present invention, the phosphor for a green color is oxynitridosilicate of $MSi_2O_2N_2$ (M=Ca, Sr, Ba) which is activated with divalent Eu and, in some cases, to which Mn is further added as a co-activator.

Still preferably, in a light emitting apparatus according to the present invention, the phosphor for a red color is either $Sr_2Si_5N_8$:Eu or $CaAlSiN_3$:Eu2+.

Still preferably, in a light emitting apparatus according to the present invention, the phosphor for a yellow color is either a BOS phosphor (BaSr) $2SiO4$:Eu2+, or YAG (Yttrium Aluminum Garnet).

Still preferably, in a light emitting apparatus according to the present invention, an encapsulating resin for encapsulating the phosphor is a silicone resin.

Still preferably, in a light emitting apparatus according to the present invention, the light emitting control section is provided with a light receiving sensor for measuring output light from the light emitting section, and controls driving current for the plurality of light sources based on a measured value from the light receiving sensor so that a light emitting ratio for the plurality of light sources reaches a predetermined light emitting ratio.

Still preferably, in a light emitting apparatus according to the present invention, the light emitting control section is provided with a light receiving sensor for measuring output light from the light emitting section, and controls driving current for the plurality of light sources based on a measured value from the light receiving sensor so that light on the black body radiation locus is obtained.

Still preferably, in a light emitting apparatus according to the present invention, the combined light is a light that is on the black body radiation locus.

Still preferably, in a light emitting apparatus according to the present invention, a color temperature is adjusted along a path of the black body radiation of the light on the black body radiation locus.

Still preferably, in a light emitting apparatus according to the present invention, colored light other than white light is obtained as a combined light.

Still preferably, in a light emitting apparatus according to the present invention, the colored light is obtained in such a manner that a desired color chromaticity is adjusted by either an external operation signal or an internal control signal via the light emitting control section to actively set the light off the black body radiation locus.

A lighting device of the present invention uses the light emitting apparatus according to the present invention as a light source, thereby achieving the objective described above.

A liquid crystal display apparatus of the present invention uses the light emitting apparatus according to the present invention as a backlight, thereby achieving the objective described above.

The functions of the present invention having the structures described above will be explained.

According to the present invention, a plurality of light sources are provided, each of which emits light with different color temperature, and the plurality of light sources each include a semiconductor light emitting element (LED) and a phosphor. A control section controls the driving of each light source to control the emission intensity. Since the emission of a phosphor is wider in the spectrum half width than the emission of an LED, the phosphor can be combined with the emission of an LED. As a result, the light emitting apparatus can be obtained with good color rendering properties since there are fewer wavelength regions where only weak emission of light exists compared with the conventional LEDs.

In addition, as for the semiconductor light emitting element, blue color LEDs are used for all the light sources without a red color LED or a green color LED. Instead, each of the phosphors radiates red, green or yellow color components. This structure allows a driving circuit that only needs to correspond to the characteristics of a blue color LED, thereby simplifying the design of the driving circuit. It is not necessary to use a complicated driving method, such as a PWM driving method, because no green color LED is used. In addition, a red color phosphor is used, whose characteristics change due to the temperature is smaller than that of a red color LED, thereby suppressing the temperature change of the red color.

Further, it is possible to control the color temperature more finely by providing three or more types of light sources, such as an adjusting third light source. Even in the case where emission from two types of light sources is not on the path of the black body radiation, it is possible to obtain the emission that is along the path of the black body radiation by adjusting light emitting balance from respective light sources.

Further, four or more types of light sources may be provided so that each color component for respective colors can be individually controlled, thereby increasing a region that covers the path of the black body radiation and emitting other colored light as well.

As described above, according to the light emitting apparatus of the present invention, the emission from the semiconductor light emitting element and the emission from the phosphor are combined, so that a light emitting apparatus with few wavelength regions where only weak emission exists and with good color rendering properties is obtained. As a result, a light source capable of maintaining the reproducibility of colors while tracing the black body radiation locus is provided. In addition, a blue color LED and a phosphor are combined, so that white light is emitted by changing a color temperature along the path of the black body radiation without using a complicated driving method for a red color LED and a green color LED. Such light can be applied for a backlight of a liquid crystal display apparatus and a lighting device (which is a toning LED lighting device in this case). An arbitrary color chromaticity may be obtained regardless of the black body radiation locus by emission control. As a result, color light is radiated and such color light can be applied to the lighting device for ambient lighting.

These and other advantages of the present invention will become apparent to those skilled in the art upon reading and understanding the following detailed description with reference to the accompanying figures.

BRIEF DESCRIPTION OF THE DRAWINGS

FIGS. 2(a) and 2(b) are schematic views showing arrangement examples of the LED light source modules in the light emitting section shown in FIG. 1.

FIG. 3 is a chromaticity diagram showing an exemplary relationship between a source and a black body radiation locus in the chromaticity diagram, showing a case where a straight line that connects each emission from a first light source 11 to a second light source 12 is located either on the black body radiation locus or below the y-coordinate of the black body radiation locus.

FIGS. 4(a) and 4(b) are diagrams showing arrangement examples of light sources.

| | |
|---|---|
| 1 | light emitting apparatus |
| 2 | light emitting section |
| 3 | light emitting control section |
| 10 | light source module |
| 11, 12, 13, 14, 15, 16 | light source |
| 21 | substrate |

DESCRIPTION OF THE PREFERRED EMBODIMENTS

One Embodiment of the light emitting apparatus according to the present invention will be described in detail hereinafter with reference to the accompanying figures.

Figure 1:
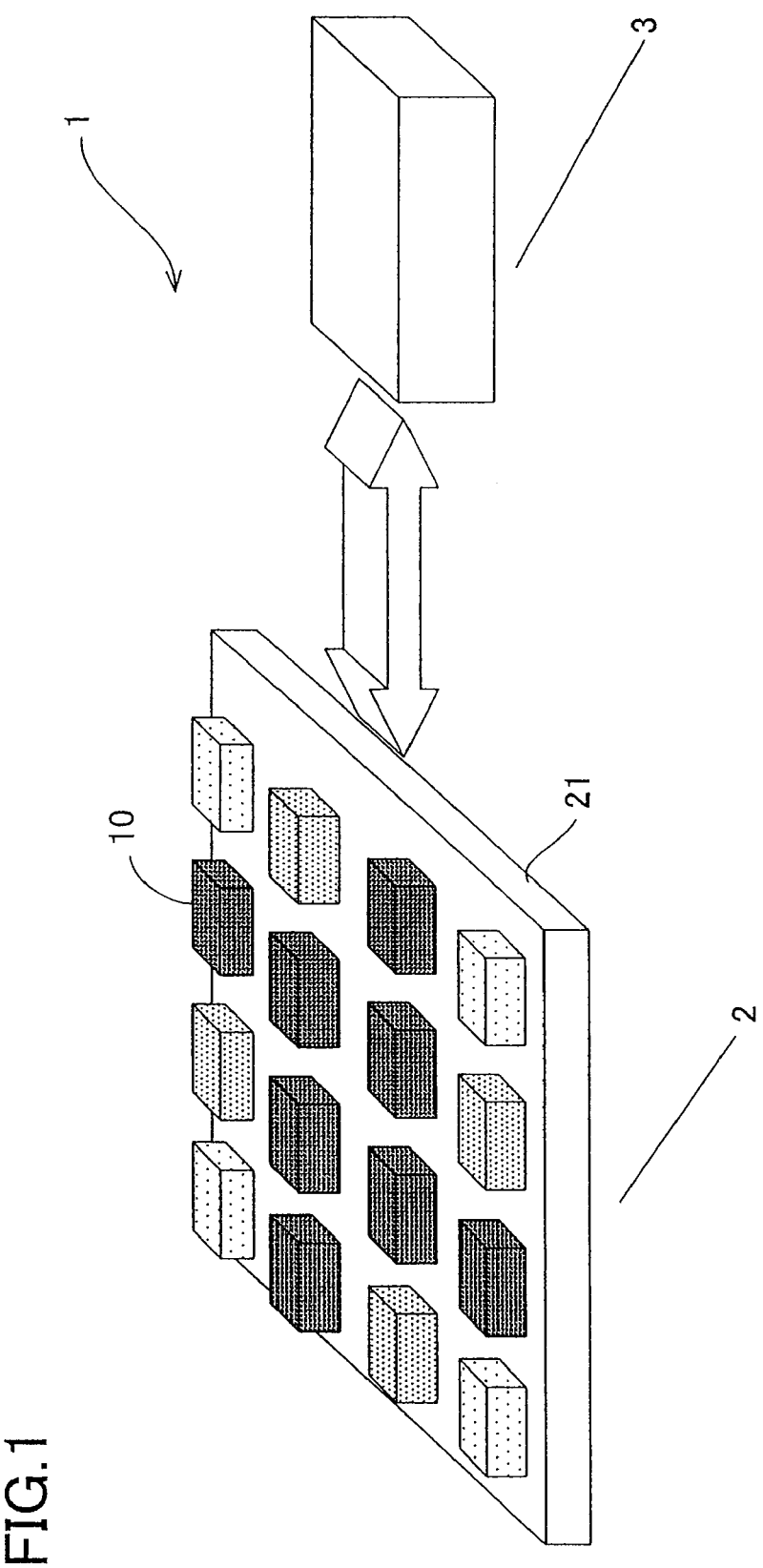
FIG. 1 is a perspective view schematically showing an essential structure of a light emitting apparatus according to the embodiment of the present invention.

FIG. 1 is a perspective view schematically showing an essential structure of a light emitting apparatus according to the Embodiment of the present invention.

Figure 11:
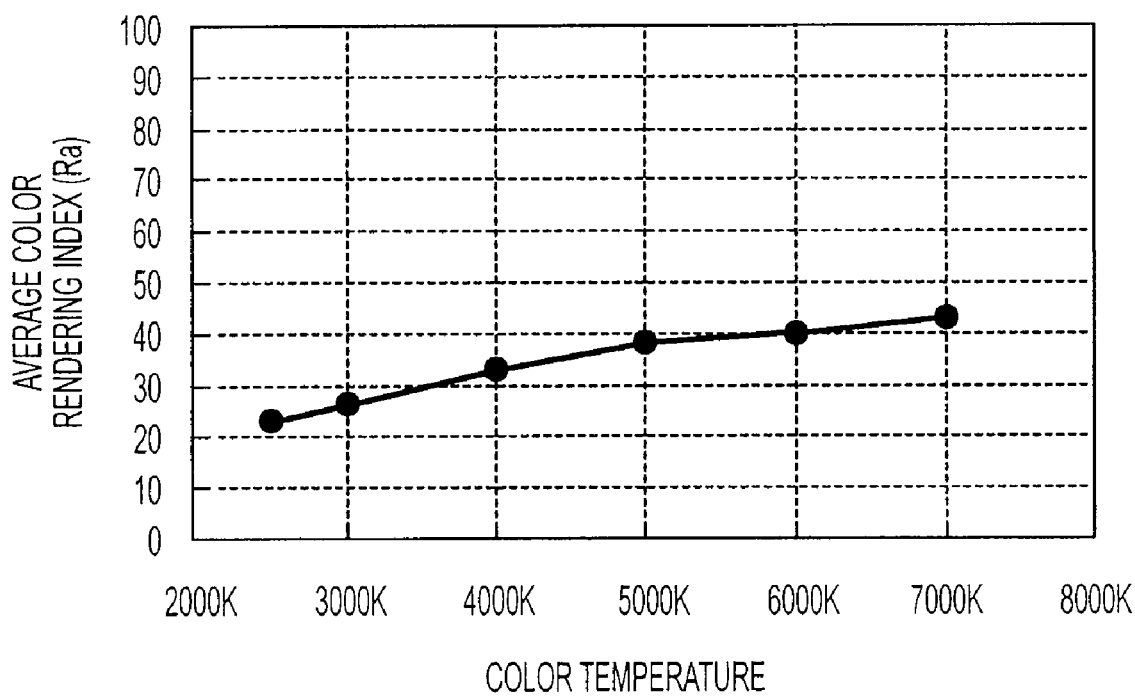
FIG. 11 is a diagram showing the change of the average color rendering index when the color temperature of an LED is changed from 2500 k to 7000 k.

In FIG. 1, the light emitting apparatus 1 according to the Embodiment includes: a light emitting section 2 provided with a plurality of light source modules 10 on a substrate 21 and used as a plurality of light sources; and a light emitting control section 3 for controlling driving of each light source module 10 to control the emission intensity of each light source module 10. Although not shown in FIG. 11, the substrate 21 is added with an electric wiring to the light source module 10 and a function to release heat that is generated in the light source modules 10.

The light source module 10 includes a semiconductor light emitting diode (LED) element as a semiconductor light emitting element and one or more types of phosphors for performing a wavelength conversion of a portion of light outputted from the LED to radiate fluorescence, thereby emitting light with different color temperatures.

One or more types of the phosphors are configured to radiate fluorescence having a wavelength of at least any one of green, yellow and red colors above the LED that outputs light having a wavelength of a blue color.

FIG. 2 is an arrangement diagram of the plurality of light source modules 10 in the light emitting section 2 in FIG. 1; and FIG. 2(a) is a schematic view of the plurality of light source modules arranged in a 16-module square pattern; and FIG. 2(b) is a schematic view showing the light source modules shown in FIG. 2(a) with more light source modules added thereto.

As shown in FIG. 2, the arrangement for the plurality of light source modules 10 (LED chip arrangement) should be designed into any pattern in accordance with the use of the light emitting apparatus 1 in FIG. 1, and therefore the arrangement should not be limited to those shown in the figures.

The light emitting control section 3 controls the driving of the plurality of light source modules 10 to control their emission intensity, so that the color temperature of the combination light from the plurality of light source modules 10 is controlled. The light emitting control section 3 is capable of adjusting and controlling the brightness of the light source modules 10 so as to obtain, for example, white light on the black body radiation locus.

In addition, the light emitting control section 3 controls driving current for a plurality of light sources based on a measured value from a light receiving sensor (not shown) that measures output light from the light emitting section 2 so that the light emitting ratio for the plurality of light sources reaches a predetermined ratio. For example, the light emitting control section 3 controls driving current for the plurality of light sources based on a measured value from the light receiving sensor so as to obtain white light on the black body radiation locus. Further, the light receiving sensor may be included in the light emitting section 2 or the light emitting control section 3, or the light receiving sensor may be positioned in a location independently of the above sections.

Next, a structural example of the light source modules 10 will be described.

For example, the plurality of light source modules 10 are basically two types of light sources, each of which emits light with different color temperature. Each of the light source modules 10 is formed with an LED chip and resin is molded to encapsulate the LED chip. One or more types of phosphors, which perform a wavelength conversion of a portion of light outputted from the LED to radiate fluorescence, are mixed as appropriate in the molded resin (encapsulating resin). Alternatively, there is such a case where such phosphors are not mixed depending on the light source module 10.

A blue LED is used for the LED. That is because a driving circuit may be designed in accordance with a characteristic of only the blue LED instead of combining a red LED and a green LED to design the driving circuit, which saves time and effort, and further, the red LED changes its characteristic due to temperature change and the green LED is significantly affected by piezoelectric effect. With respect to wavelengths of green, yellow and red colors, wavelength conversion is performed on a wavelength of a blue color that is emitted from the LED. This results in that a wavelength region of only weak emission of light is produced and color rendering properties are decreased if the respective emission of the three primary colors from the red, green and blue LEDs is combined. In the case where a phosphor is used, the emission of the phosphor is wider in the half width than the emission of the LED, and therefore the emission of the phosphor is ranged inside the chromaticity diagram. Although clear colors may not be obtained through the emission of the phosphor, pure blue, green or red color is rarely used for a lighting device, and therefore there is no significant problem in using the phosphor as a lighting source.

Such light source modules 10 as two light sources are driven and controlled by the light emitting control section 3 to change the light emitting ratio, so that the color temperature of the light emitted from the light emitting apparatus 1 is changed. Further, in the case where the black body radiation locus cannot be traced just by changing the light emitting ratio from respective light source modules 10 as two light sources, another adjusting light source can be provided. Further, a light source of another color (such as a fourth light source, a fifth light source, and the like) can be added in order to expand the range of colors emittable.

That is, in the case where the black body radiation locus cannot be traced just by changing the light emitting ratio from respective light source modules 10 as two light sources, another light source module 10 as an adjusting third light source may be provided, the adjusting third light source correcting the emission of light from respective light source modules 10 and being capable of tracing the black body radiation locus, and the light emitting ratio of the respective light source modules 10 may be changed by the light emitting control section 3, so that the black body radiation locus is traceable by the light emitting control section 3. In other words, with regard to a plurality of light source modules 10, three types of light source modules 10 that surround the black body radiation locus are provided, and the light emitting control section 3 controls driving current for the three types of the light source modules 10 to change the light emitting ratio for the three types of light source modules 10, thereby changing the color temperature of the combined light.

Several possible relationships between the two types of light sources described above and the black body radiation locus in the chromaticity diagram can be conceived as described in the following.

FIG. 3 is a chromaticity diagram showing an exemplary relationship between a source and a black body radiation locus B in the chromaticity diagram as well as the light source and an adjusting range A in which a color temperature is desired to be changed along the black body radiation locus B. FIG. 3 is a chromaticity diagram showing a case where a straight line that connects a first light source 11 and a second light source 12 in two light source modules 10 is located below the adjusting range A in the y-coordinate.

In this case, another adjusting third light source 13 is further provided. The third light source 13 is set in a chromaticity in such a manner that the adjusting range A will be included inside a triangle that connects the first light source 11, the second light source 12 and the third light source 13. In the example shown in FIG. 3, the chromaticity coordinates (x, y) of the first light source 11 are set as (0.250, 0.250), the chromaticity coordinates (x, y) of the second light source 12 are set as (0.500, 0.415), and the chromaticity coordinates (x, y) of the third light source 13 are set as (0.400, 0.500). An exemplary arrangement of the light sources in this case is shown in FIG. 4(a). As a result, the light sources 11, 12 and 13 form the triangle shown in FIG. 3, and the respective light emitting ratios for the light sources 11-13 are controlled by the control section 3, so that the adjusting range A can be controlled to trace the desired black body radiation locus B.

Basically, because the emission of light is ensured from the wavelength region of the green color to that of the red color by the emission of phosphors of the first light source 11 and the second light source 12 described above and the color rendering properties are improved, the third light source 13 may be a single LED or a phosphor that is provided to perform a wavelength conversion of the light emitted from an LED.

In addition, a fourth light source 14 and a fifth light source 15 shown in FIG. 3 may be added in order to expand the adjustable range of the color temperature. For example, adding the fourth light source 14 enables the range to be extended towards higher color temperature range and adding the fifth light source 15 enables the range to be extended towards lower color temperature range. According to the example in FIG. 3, the chromaticity coordinates (x, y) of the fourth light source 14 are set as (0.120, 0.120) and the chromaticity coordinates (x, y) of the fifth light source 15 are set as (0.650, 0.340). An exemplary arrangement of the light sources in this case is shown in FIG. 4(*b*).

Figure 5:
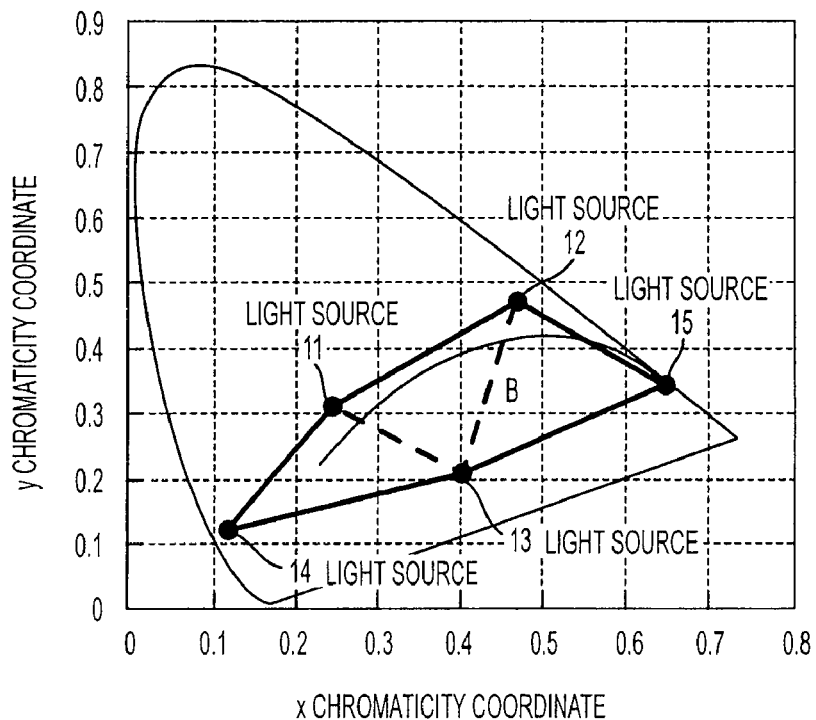
FIG. 5 is a chromaticity diagram showing an exemplary relationship between the light source and the black body radiation locus in the chromaticity diagram, showing a case where a straight line that connects each emission from the first light source 11 to the second light source 12 does not intersect the black body radiation locus and is located above the y-coordinate of the black body radiation locus.

FIG. 5 is a chromaticity diagram showing an exemplary relationship between the source and the black body radiation locus B in the chromaticity diagram as well as the light source and the adjusting range A in which a color temperature is desired to be changed along the black body radiation locus B. FIG. 5 is a chromaticity diagram showing a case where a straight line that connects the first light source 11 and the second light source 12 is located above the adjusting range A in the y-coordinate.

In this case, an adjusting third light source 13 is further provided. The third light source 13 is set in a chromaticity in such a manner that the adjusting range A will be included inside a triangle that connects the first light source 11, the second light source 12 and the third light source 13. In the example shown in FIG. 5, the chromaticity coordinates (x, y) of the first light source 11 are set as (0.250, 0.300), the chromaticity coordinates (x, y) of the second light source 12 are set as (0.470, 0.470), and the chromaticity coordinates (x, y) of the third light source 13 are set as (0.400, 0.200). An exemplary arrangement of the light sources in this case is shown in FIG. 4(*a*). As a result, the first light source 11, the second light source 12 and the third light source 13 form the triangle shown in FIG. 5, and the respective light emitting ratios for the first, second and third light sources 11-13 are controlled by the control section 3, so that the adjusting range A is controllable to trace the desired black body radiation locus B.

Basically, because the emission of light is ensured from the wavelength region of the green color to that of the red color by the emission of phosphors of the first light source 11 and the second light source 12 described above and the improvement in color rendering properties is achieved, the third light source 13 may be a single LED or a phosphor that is provided to perform a wavelength conversion of the light emitted from an LED.

In addition, a fourth light source 14 and a fifth light source 15 shown in FIG. 5 may be added in order to expand the adjustable range of the color temperature. For example, adding the fourth light source 14 enables the range to be extended towards higher color temperature range and adding the fifth light source 15 enables the range to be extended towards lower color temperature range. According to the example in FIG. 5, the chromaticity coordinates (x, y) of the fourth light source 14 are set as (0.120, 0.120) and the chromaticity coordinates (x, y) of the fifth light source 15 are set as (0.650, 0.340). An exemplary arrangement of the light sources in this case is shown in FIG. 4(*b*).

Figure 6:
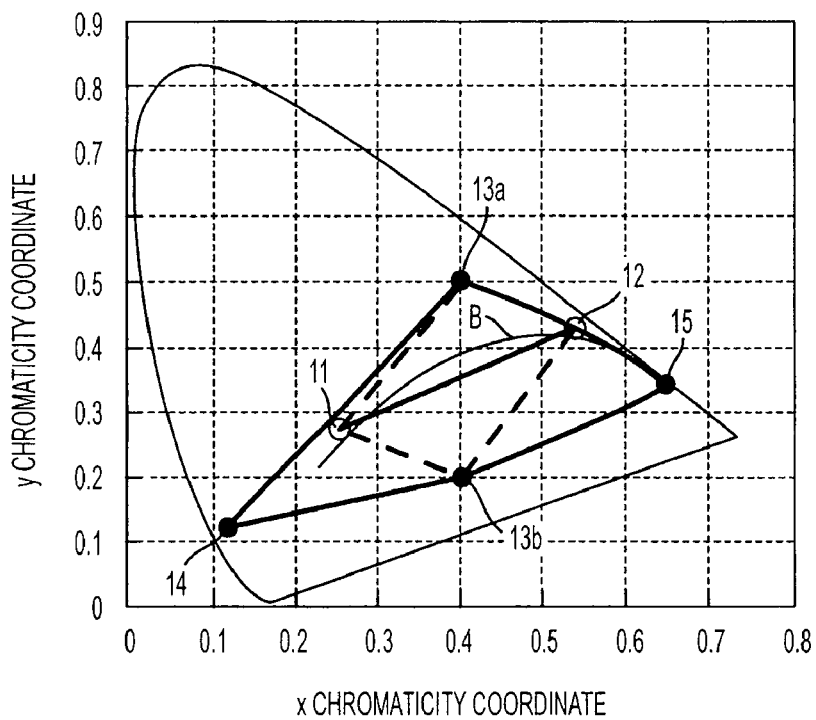
FIG. 6 is a chromaticity diagram showing an exemplary relationship between the light source and the black body radiation locus in the chromaticity diagram, showing a case where a straight line that connects the emission from the first light source 11 to the emission of the second light source 12 intersects the black body radiation locus.

FIG. 6 is a chromaticity diagram showing an exemplary relationship between the source and the black body radiation locus in the chromaticity diagram, the chromaticity diagram showing a case where a straight line that connects the emission of the first light source 11 and the emission of the second light source 12 intersects the black body radiation locus.

As shown in FIG. 6, a case will be described where the straight line that connects the emission of the first light source 11 and the emission of the second light source 12 intersects the adjusting range A.

Figures 7A, 7B, 8:
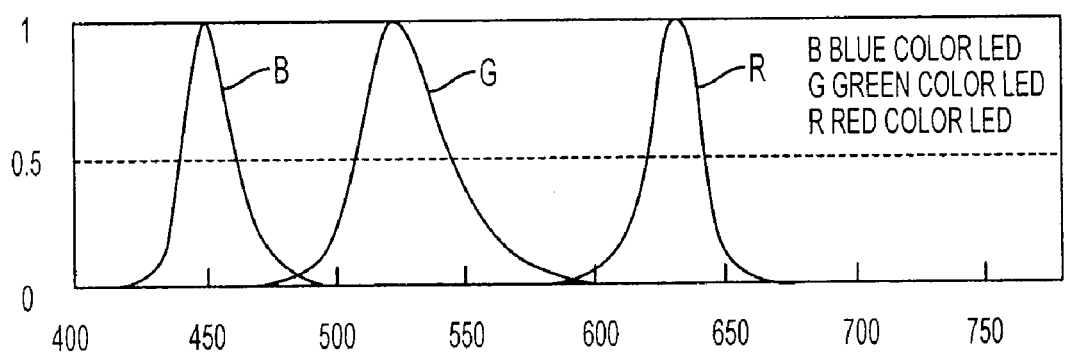
FIGS. 7(a) and 7(b) are diagrams showing arrangement examples of light sources.
FIG. 8 is a diagram showing emission spectra of a blue LED, a green LED and a red LED.
Figures 9, 10:
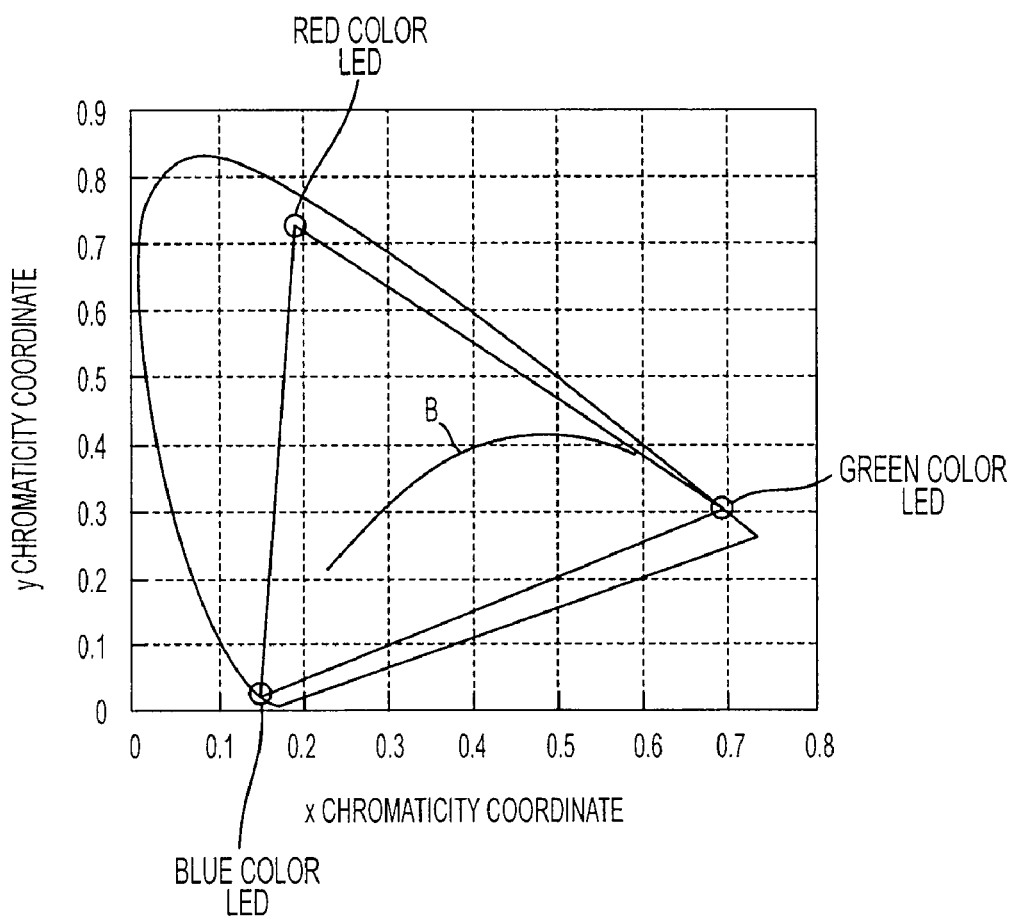
FIG. 9 is a diagram showing the chromaticity coordinates of each of the three primary color LEDs in the case where white light is obtained.
FIG. 10 is a chromaticity diagram showing the relationship between the emission of the blue, green and red LEDs and the black body radiation locus.

In this case, another adjusting fourth light source 13*b* is further provided other than the third light source 13*a*. The third light source 13*a* only is not able to set the adjusting range A in such a manner that the adjusting range A will be included inside the triangle that connects the first light source 11, the second light source 12 and the third light source 13. Therefore, a fourth light source 13*b* is provided, so that the fourth light source 13*b* is set in a chromaticity in such a manner that the adjusting range A will be included inside a quadrilateral that connects the first light source 11, the second light source 12, the third light source 13*a* and the fourth light source 13*b*. According to the example in FIG. 6, the chromaticity coordinates (x, y) of the first light source 11 are set as (0.250, 0.270), the chromaticity coordinates (x, y) of the second light source 12 are set as (0.480, 0.440), the chromaticity coordinates (x, y) of the third light source 13*a* are set as (0.400, 0.500) and the chromaticity coordinates (x, y) of the other fourth light source 13*b* are set as (0.500, 0.280). An exemplary arrangement of the light sources in this case is shown in FIG. 7(*a*). As a result, two triangles are formed with the first light source 11, the second light source 12, the third light source 13*a* and the other fourth light source 13*b* as shown in FIG. 6, and the respective light emitting ratios for the first light source 11 through the other fourth light source 16 are controlled by the control section 3, so that the adjusting range A can be controlled to trace the desired black body radiation locus B.

In addition, a fourth light source 14 and a fifth light source 15 shown in FIG. 6 may be added in order to expand the adjustable range of the color temperature. For example, adding the fourth light source 14 enables the range to be extended towards higher color temperature range and adding the fifth light source 15 enables the range to be extended towards lower color temperature range. According to the example in FIG. 6, the chromaticity coordinates (x, y) of the fourth light source 14 are set as (0.120, 0.120) and the chromaticity coordinates (x, y) of the fifth light source 15 are set as (0.650, 0.340). An exemplary arrangement of the light sources in this case is shown in FIG. 7(*b*).

More specific Examples 1-4 of the light emitting apparatus 1 according to the present invention will be described in detail hereinafter.

Example 1

According to Example 1, a case is described where a light source is provided as a first light source 11 with a phosphor that radiates fluorescence at a green color wavelength (a green color phosphor hereinafter) and a phosphor that radiates fluorescence at a red color wavelength (a red color phosphor hereinafter) above a blue color LED; and a light source is provided as a second light source with a phosphor that radiates fluorescence at a yellow color wavelength (a yellow phosphor hereinafter) and a red color phosphor.

An InGaN LED is used for the blue LED in the first light source 11. In addition, α-sialon (α-SiAlON:Ce3+), β-sialon (β-SiAlON:Eu2+), Sr-aluminate (SrAl$_2$O$_4$:Eu2+), (Sr, Ba)$_2$SiO$_4$:Eu2+, Ca$_3$(Sc, Mg)$_2$Si$_3$O$_{12}$:Ce3+, and the like are used for the green color phosphor. Sr$_2$Si$_5$N$_8$:Eu or CaAlSiN$_3$: Eu2+ is used for the red color phosphor. Further, silicone resin is used here, and the ratio of the green color phosphor to the red color phosphor is set to a predetermined ratio that would enable the phosphors to produce white light. As a result, emission of white light, whose chromaticity coordinates (x, y)=(0.342, 0.312), with a high color rendering of about 5000 K is obtained.

An InGaN LED is used for the blue LED in the second light source 12. In addition, a BOS phosphor (BaSr)$_2$SiO$_4$:Eu2+ or YAG (Yttrium Aluminum Garnet) is used for the yellow color phosphor, and Sr$_2$Si$_5$N$_8$: Eu or CaAlSiN$_3$:Eu2+ is used for the red color phosphor. Further, silicone resin is used here, and the ratio of the yellow color phosphor to the red color phosphor is set to a predetermined ratio that would enable the phosphors to produce white light. As a result, a light, whose chromaticity coordinates (x, y)=(0.410, 0.350), with a low color temperature around 3000 K is obtained.

That is, a light source is provided as the first light source 11 among a plurality of light source modules 10, the light source having a phosphor that radiates fluorescence at a green color wavelength and a phosphor that radiates fluorescence at a red color wavelength above a blue color LED, which is a semiconductor light emitting element that outputs light at a blue color wavelength; and a light source is provided as the second light source 12 among the plurality of light source modules 10, the light source having a phosphor that radiates fluorescence at a yellow color wavelength and a phosphor that radiates fluorescence at a red color wavelength above a blue color LED, which is a semiconductor light emitting element that outputs light at a blue color wavelength.

The first light source 11 and the second light source 12 are arranged so that the light emitting control section 3 controls the driving of the first light source 11 and the second light source 12, thereby changing the light emitting ratio. As a result, in the chromaticity coordinates (x, y), the emission from the light source can be changed on the straight line that connects the emission from the first light source 11 and the emission from the second light source 12. According to Example 1 of the present invention, because the adjustable range of the color temperature is narrow, deviation from the black body radiation locus is small even if the two light sources are linearly changed. Therefore a configuration with two light sources is obtained.

As described above, the light emitting apparatus 1 according to Example 1 using the first light source 11 and the second light source 12 that respectively have an LED and a phosphor, has fewer wavelength regions where only weak emission of light exists compared with the conventional light emitting apparatus 100 using a red LED, a blue LED and a green LED, which is disclosed in Reference 1, thereby obtaining a light emitting apparatus with good color rendering properties. Further, because a red LED or a green LED is not used in Example 1, it is possible to design a driving circuit without being restricted by PWM control.

Example 2

According to Example 2, a case is described where the black body radiation locus cannot be traced by changing the light emitting ratio of only two types of light sources, the first light source 11 and the second light source 12, and where, in addition to the first light source 11 and the second light source 12 of Example 1 described above, a light source as an adjusting third light source 13 is provided above a blue LED, the third light source having a green color phosphor.

In the adjusting third light source 13, an InGaN LED is used for the blue LED. In addition, α-sialon (α-SiAlON: Ce3+), β-sialon (β-SiAlON:Eu2+), Sr-aluminate (SrAl2O4: Eu2+), (Sr, Ba)$_2$SiO$_4$:Eu2+, Ca3(Sc, Mg)$_2$Si$_3$O$_{12}$:Ce3+, and the like are used for the green color phosphor. Further, silicone resin is used here. As a result, emission of whitish, green light is obtained with the chromaticity coordinates (x, y)= (0.325, 0.522).

That is, a light source is provided as the first light source 11 among a plurality of light source modules 10, the light source having a phosphor that radiates fluorescence at a green color wavelength and a phosphor that radiates fluorescence at a red color wavelength above a blue color LED, which is a semiconductor light emitting element that outputs light at a blue color wavelength; and a light source is provided as the second light source 12 among the plurality of light source modules 10, the light source having a phosphor that radiates fluorescence at a yellow color wavelength and a phosphor that radiates fluorescence at a red color wavelength above a blue color LED, which is a semiconductor light emitting element that outputs light at a blue color wavelength; and a light source is provided as the third light source 13 among the plurality of light source modules 10, the light source having a phosphor that radiates fluorescence at a green color wavelength above a blue color LED, which is a semiconductor light emitting element that outputs light at a blue color wavelength.

The first light source 11, the second light source 12 and the adjusting third light source 13 described above are arranged as shown in FIG. 4(a) or 4(b) so that the light emitting control section 3 controls the driving of the first light source 11, the second light source 12, and the third light source 13, thereby changing the light emitting ratio. As a result, the black body radiation locus B is surrounded by the first light source 11, the second light source 12 and the adjusting third light source 13 in the chromaticity diagram, and therefore the black body radiation locus B can be traced to control the color temperature more precisely.

Example 3

According to Example 3, a case is described where a light source is provided as a first light source 11, the light source having a green color phosphor above a blue color LED, and a light source is provided as a second light source 12, the light source having a red color phosphor above a blue color LED, and a blue LED is provided as a adjusting third light source 13.

In the first light source 11, an InGaN LED is used for the blue LED. In addition, α-sialon (α-SiAlON:Ce3+), β-sialon (β-SiAlON:Eu2+), Sr-aluminate (SrAl$_2$O$_4$:Eu2+), (Sr, Ba)$_2$SiO$_4$:Eu2+, Ca$_3$(Sc, Mg)$_2$Si$_3$O$_{12}$:Ce3+, and the like are used for the green color phosphor. Further, silicone resin is used here. As a result, emission of whitish, green light is obtained with the chromaticity coordinates (x, y)=(0.325, 0.522).

In the second light source 12, an InGaN LED is used for the blue LED. In addition, Sr$_2$Si$_5$N$_8$:Eu or CaAlSiN$_3$:Eu2+ is used for the red color phosphor. Further, silicone resin is used here. As a result, emission of whitish, red light is obtained with the chromaticity coordinates (x, y)=(0.643, 0.306).

In the adjusting third light source 13, an InGaN LED is used for the blue LED. In addition, silicone resin is used, and no phosphor is mixed here. As a result, a blue color light is obtained with the chromaticity coordinates (x, y)=(0.153, 0.025).

That is, a light source is provided as the first light source 11 among a plurality of light source modules 10, the light source having a phosphor that radiates fluorescence at a green color wavelength above a blue color LED, which is a semiconductor light emitting element that outputs light at a blue color wavelength; and a light source is provided as the second light source 12 among the plurality of light source modules 10, the light source having a phosphor that radiates fluorescence at a red color wavelength above a blue color LED, which is a semiconductor light emitting element that outputs light at a blue color wavelength; and a blue color LED, which is a semiconductor light emitting element that outputs light at a blue color wavelength, is provided as the adjusting third light source 13 among the plurality of light source modules 10.

The first light source 11, the second light source 12 and the adjusting third light source 13 are arranged as shown in FIG. 4(a) or 4(b) so that the light emitting control section 3 controls the driving of the first light source 11, the second light source 12, and the third light source 13, thereby changing the light emitting ratio. As a result, the black body radiation locus B is surrounded by the first light source 11, the second light source 12 and the adjusting third light source 13 in the chromaticity diagram, and therefore the black body radiation locus B can be traced by the light emitting ratio even if each emission of the first light source 11 and the second light source 12 is not on the black body radiation locus B.

Example 4

According to Example 4, a case is described where a light source is provided as the first light source 11, the light source having a green color phosphor and a red color phosphor above the blue color LED described in Example 1; and a light source is provided as the second light source 12 with a yellow color phosphor and a red color phosphor above the blue color LED described in Example 1; and a light source is provided as the third light source 13, the light source having a green color phosphor above the blue color LED described in Example 2; and a light source is provided as the fourth light source 16, the light source having a red phosphor above the blue color LED described in Example 3. In addition, a case where a blue LED is added as the adjusting third light source 13 is provided; and a case where the adjusting third light source 13 is not provided is also provided.

That is, a light source is provided as the first light source 11 among a plurality of light source modules 10, the light source having a phosphor that radiates fluorescence at a green color wavelength and a phosphor that radiates fluorescence at a red color wavelength above a blue color LED, which is a semiconductor light emitting element that outputs light at a blue color wavelength; and a light source is provided as the second light source 12 among the plurality of light source modules 10, the light source having a phosphor that radiates fluorescence at a yellow color wavelength and a phosphor that radiates fluorescence at a red color wavelength above a blue color LED, which is a semiconductor light emitting element that outputs light at a blue color wavelength; and a light source is provided as the third light source 13 among the plurality of light source modules 10, the light source having a phosphor that radiates fluorescence at a green color wavelength above a blue color LED, which is a semiconductor light emitting element that outputs light at a blue color wavelength; a light source is provided as the fourth light source 16 among the plurality of light source modules 10, the light source having a phosphor that radiates fluorescence at a red color wavelength above a blue color LED, which is a semiconductor light emitting element that outputs light at a blue color wavelength.

The first light source 11, the second light source 12, the adjusting third light source 13 as well as the fourth light source 16 are arranged so that the light emitting control section 3 controls the driving of the first light source 11, the second light source 12 the third light source 13, and further the fourth light source 16, thereby changing the light emitting ratio. As a result, it emits new colors and a region that is capable of covering the black body radiation locus B is increased.

According to the Embodiment and Examples 1-4 described above, the light emitting section 2 is provided with two or more types of light source modules 10, each of which including an LED and a phosphor, emits light with different color temperature, and the control section 3 controls the driving of each light source module 10, thereby controlling the emission intensity. Since the emission of a phosphor is wider in the spectrum half width than the emission of an LED, the phosphor can be combined with the emission of an LED, and as a result, the light emitting apparatus 1 can be obtained with no loss of wavelength and with good color rendering properties. In addition, the light emitting apparatus 1 uses a blue color LED and emits a red color component, a green color component, a yellow color component and the like by phosphors, so that the light emitting apparatus 1 is not limited to a conventional complicated PWM driving method. As a result, the light emitting apparatus 1 will have good color rendering properties and will be capable of emitting white light and light of other colors by changing a color temperature along the path of the black body radiation without being limited to a conventional PWM driving method.

Although not described in the Embodiment and the Examples 1-4 described above, each light source module 10 includes a semiconductor light emitting element and one, two or more types of phosphors for performing a wavelength conversion of a portion of light outputted from the semiconductor light emitting element to radiate fluorescence; and the light emitting apparatus 1 is configured with a light emitting section 2 that has a plurality of light sources, the light sources respectively emitting light with different color temperatures, and a control section 3 for controlling the driving of the plurality of light sources and controlling the emission intensity from the light sources to control the color temperature of light. In this case, the light emitting apparatus 1 has two types of light sources as the plurality of light sources. The driving current for the two types of light sources is controlled by the light emitting control section 3 to change the light emitting ratio of the two types of the light sources, so that the color temperature of combined light emitted from the light emitting section 2 is changed. Alternatively, in the case where the light emitting apparatus 1 is not able to trace the black body radiation locus even if the light emitting ratio of the two types of the light sources are changed, the emission of light from the two types of light sources are corrected by providing an adjusting third light source that enables tracing the black body radiation locus, and the light emitting ratio for each light source is changed by the light emitting control section 3. As a result, the light emitting apparatus 1 is able to trace the black body radiation locus. That is, the light emitting section 2 is a light source configured with an LED and a phosphor that have a function to trace the black body radiation locus. Therefore, the light emitting section 2 includes a first light source 11 emitting white light of high color temperature, a second light source 12 emitting white light of low color temperature, and a third light source 13 whose y-axis of the chromaticity coordinates is greater than the two white colors. When the light emitting ratio of the first light source 11 and the second light source 12 is changed, the color temperature of the combined light is changed. However, the y-coordinate of chromaticity coordinates will shift from the black body radiation locus to a lower y value. In order to correct this shift, a third light source 13 is further provided, whose y-coordinate of chromaticity coordinates is greater than that of the first light source 11 or the second light source 12, so that the color temperature of the combined light is shifted back on the black body radiation locus. As a result, the light emitting apparatus 1 will have better color rendering properties when using a phosphor as a light source than when using three color LEDs. Furthermore, the light emitting apparatus 1 will be able to emit white light and light of other colors by changing the color temperature along the path of the black body radiation without a complicated driving method, such as a PWM driving method, thereby achieving the objective of the present invention.

Although not specifically described in the Embodiment and the Examples 1-4 described above, FIGS. 12 and 13 will be explained hereinafter.

Figure 12:
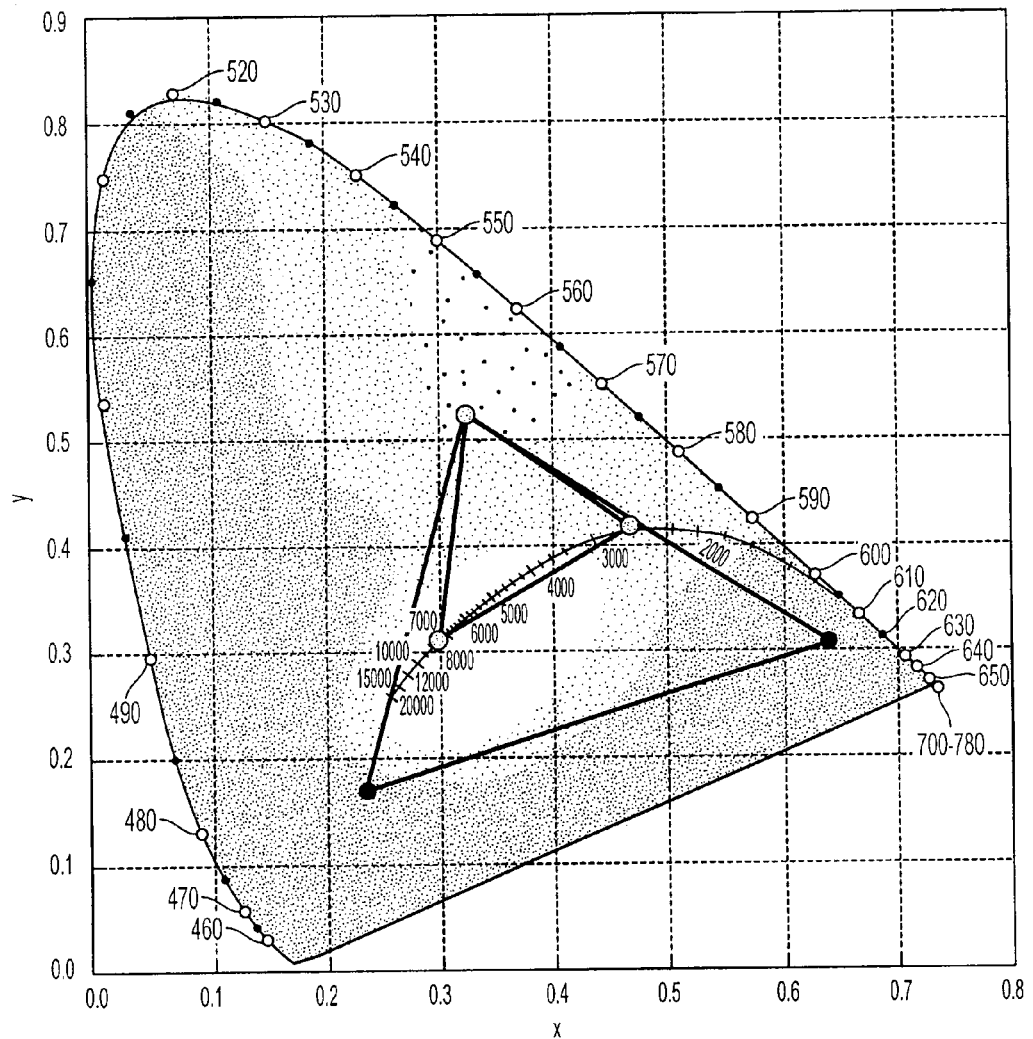
FIG. 12 is a chromaticity diagram showing a relationship between a light source and a black body radiation locus that is on the chromaticity diagram.
Figure 13:
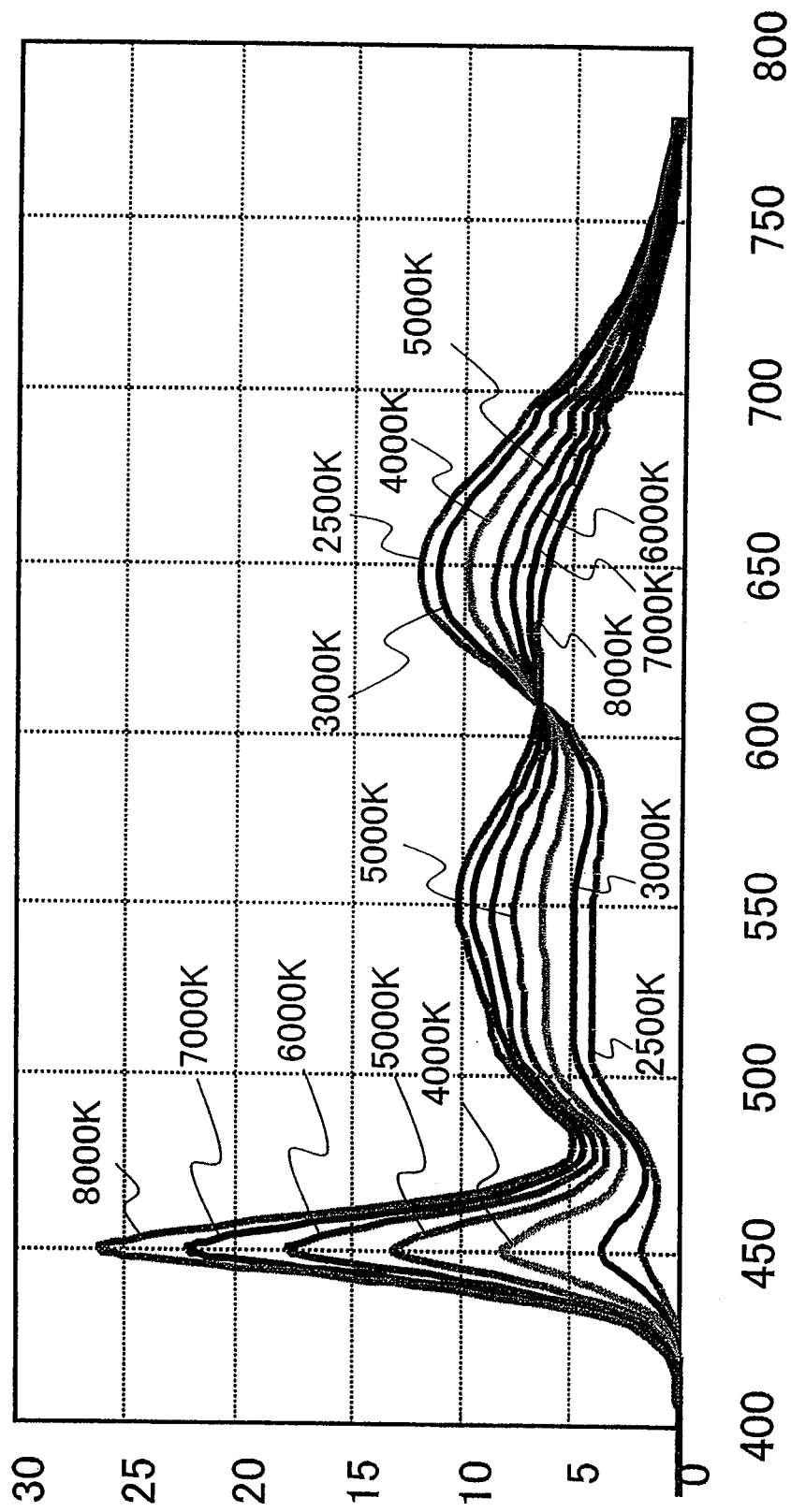
FIG. 13 is a diagram showing emission spectra of an LED at color temperatures from 2500 k to 8000 k.

FIG. 12 is a chromaticity diagram showing a relationship between a light source and a black body radiation locus in the chromaticity diagram. FIG. 13 is a diagram showing emission spectra of an LED at color temperatures from 2500 k to 8000 k.

As shown in FIG. 13, at the emission spectra at the light wavelengths of 650 nm (red color), 600 nm (orange color), 550 nm (green color), 500 nm (blue-green color) and 450 nm (blue color), the same white light on the path of the black body radiation shown in FIG. 12 turns into a light-bulb-like, reddish white at 2500 k-3000 k, where the color temperature is low, and turns its color into somewhat yellowish white at the color temperature of 5000 k, and turns into dark bluish white at the high color temperature of 8000 k. Therefore, for the same white light on the line of the blackbody radiation, the color temperature needs to be decreased to decrease the bluish color and increase the reddish color in the white light, whereas the color temperature needs to be increased to increase the bluish color and decrease the reddish color in the white light.

In addition, though not specifically described in the Embodiment and the Examples 1-4 described above, the light emitting apparatus 1 according to the present invention can be applied to a lighting device for ambient lighting using the light emitting apparatus 1 as a lighting source. Further, the light emitting apparatus 1 according to the present invention can be applied to a liquid crystal display apparatus as a backlight. In these cases, the combined light of the light emitted from a plurality of light sources is either light on the black body radiation locus or colored light that is not fixed on the black body radiation locus. The color temperature of the light on the black body radiation locus may be adjusted along the path of the black body radiation. Alternatively, the color temperature may be adjusted via the light emitting control section 3 either by a user operating an operation button to output an external operation signal or by an internal control signal that is automatically outputted in accordance with a predetermined condition in order to increase the bluish color and decrease the reddish color or to increase the reddish color and decrease the bluish color. In addition, the color light mentioned above may be obtained in such a manner that the desired color chromaticity is adjusted by the external operation signal or the internal control signal via the light emitting control section 3 to set actively the light off the black body radiation locus.

For example, with respect to the lighting device for ambient lighting, the color temperature can be increased to increase the bluish color and decrease the reddish color of the same white light on the line of the black body radiation as described above to obtain a bluish white light, which is said to have a crime-prevention effect. Alternatively, the color temperature can be decreased to increase the reddish color and decrease the bluish color, so that the light that is warm, which is said to be preferred before bedtime, is obtained. Alternatively, these color temperatures along the path of the black body radiation may be adjusted in accordance with a predetermined condition. When enjoying karaoke or listening to music in a room, white light may be emitted to obtain the light that matches the music by changing the color temperature along the path of the black body radiation. An arbitrary color chromaticity may be obtained regardless of the black body radiation locus by actively adjusting the light off the black body radiation locus by the light emitting control section 3. As a result, a variety of preferable color lights are radiated, which can express faint and subtle difference. Such color lights can also be applied to a lighting device for ambient lighting.

As described above, the present invention is illustrated by the use of its preferred Embodiment and Examples 1 to 4. However, the present invention should not be interpreted solely based on the Embodiment and Examples 1 to 4 described above. It is understood that the scope of the present invention should be interpreted solely based on the claims. It is also understood that those skilled in the art can implement equivalent scope of technology, based on the description of the present invention and common knowledge from the description of the detailed preferred Embodiment and Examples 1 to 4 of the present invention. Furthermore, it is understood that any patent, any patent application and any references cited in the present specification should be incorporated by reference in the present specification in the same manner as the contents are specifically described therein.

Industrial Applicability

According to the present invention, in the field of a light emitting apparatus that emits light, such as white light, using a semiconductor light emitting diode (LED) element and a phosphor that converts a wavelength of output light from the light emitting diode (LED) element; a lighting device using the light emitting apparatus as a light source; and a liquid crystal display apparatus using the light emitting apparatus as a backlight, the emission from a semiconductor light emitting element and the emission from a phosphor are combined, so that a light emitting apparatus is obtained with few wavelength regions of only weak emission and with good color rendering properties, thereby realizing a light source that can trace the black body radiation locus while maintaining the reproducibility of colors. In addition, a blue color LED and a phosphor are combined, so that white light is emitted by changing a color temperature along the path of the black body radiation without using a complicated driving method for a red color LED and a green color LED. Such light can be applied for a backlight of a liquid crystal display apparatus and a lighting device (which is a toning LED lighting device in this case). An arbitrary color chromaticity may be obtained regardless of the black body radiation locus by emission control. As a result, colored light is radiated and such color light can be applied to a lighting device for ambient lighting.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A light emitting apparatus, comprising:
a light emitting section having a plurality of light sources, including
a first light source having a green phosphor that fluoresces at a green color wavelength and a red phosphor that fluoresces at a red color wavelength mixed in an encapsulating resin, and
a second light source having a yellow phosphor that fluoresces at a yellow color wavelength and a red phosphor that fluoresces at a red color wavelength mixed in an encapsulating resin, each of the light sources including a semiconductor light emitting element outputting light having a wavelength of a blue color, and
a light emitting control section for controlling emission intensity of each of the plurality of light sources to control a color temperature of a combined light emitted from the plurality of light sources.

2. A light emitting apparatus according to claim 1, wherein one or more types of phosphors fluoresces at a wavelength of at least any one of green, yellow and red colors above the semiconductor light emitting element.

3. A light emitting apparatus according to claim 1, further including at least two types of light sources as the plurality of light sources, wherein the light emitting control section controls driving current for the at least two types of light sources and changes a light emitting ratio for the at least two types of light sources to change the color temperature of the combined light.

4. A light emitting apparatus according to claim 3, wherein the light emitting section includes the at least two types of light sources and a third light source, and the light emitting control section controls the driving current and changes the light emitting ratio for each light source to change a range of the color temperature within which the combined light can be emitted.

5. A light emitting apparatus according to claim 4, wherein the third light source is either a light source of a single semiconductor light emitting element or a light source having a semiconductor light emitting element and a phosphor for performing a wavelength conversion of light emitted from the semiconductor light emitting element.

6. A light emitting apparatus according to claim 4, further including:
a light source having a phosphor that fluoresces at a green color wavelength as the third light source above the semiconductor light emitting element.

7. A light emitting apparatus according to claim 4, further including:
a light source having the semiconductor light emitting element as the third light source.

8. A light emitting apparatus according to claim 4, further including a fourth light source of the plurality of light sources, the fourth light source having a phosphor that fluoresces at a red color wavelength above the semiconductor light emitting element.

9. A light emitting apparatus according to claim 6, wherein a triangle formed by the first light source, the second light source and the third light source includes a portion of a black body radiation locus in chromaticity coordinates.

10. A light emitting apparatus according to claim 7, wherein a triangle formed by the first light source, the second light source and the third light source includes a portion of a black body radiation locus in chromaticity coordinates.

11. A light emitting apparatus according to claim 9, wherein a quadrilateral formed by the first light source, the second light source, the third light source and a fourth light source includes a portion of the black body radiation locus in the chromaticity coordinates.

12. A light emitting apparatus according to claim 10, wherein a quadrilateral formed by the first light source, the second light source, the third light source and a fourth light source includes a portion of the black body radiation locus in the chromaticity coordinates.

13. A light emitting apparatus according to claim 4, further including one or more types of other colors of light sources so as to expand an adjustable range of the color temperature.

14. A light emitting apparatus according to claim 13, wherein the light sources of other colors are light sources for high color temperature extension and/or low color temperature extension.

15. A light emitting apparatus according to claim 1, wherein the semiconductor light emitting element is a semiconductor light emitting diode element.

16. A light emitting apparatus according to claim 15, wherein the semiconductor light emitting element for a blue color is an InGaN semiconductor light emitting diode element.

17. A light emitting apparatus according to claim 2, wherein the semiconductor light emitting element for a blue color is an InGaN semiconductor light emitting diode element.

18. A light emitting apparatus according to claim 15, wherein the phosphor for a green color is oxynitridosilicate of $MSi_2O_2N_2$ (M=Ca, Sr, Ba) which is activated with divalent Eu.

19. A light emitting apparatus according to claim 2, wherein the phosphor for a green color is oxynitridosilicate of $MSi_2O_2N_2$ (M=Ca, Sr, Ba) which is activated with divalent Eu.

20. A light emitting apparatus according to claim 15, wherein the phosphor for a red color is either $Sr_2Si_5N_8$:Eu or $CaAlSiN_3$:Eu2+.

21. A light emitting apparatus according to claim 2, wherein the phosphor for a red color is either $Sr_2Si_5N_8$:Eu or $CaAlSiN_3$:Eu2+.

22. A light emitting apparatus according to claim 15, wherein the phosphor for a yellow color is YAG (Yttrium Aluminum Garnet).

23. A light emitting apparatus according to claim 2, wherein the phosphor for a yellow color is YAG (Yttrium Aluminum Garnet).

24. A light emitting apparatus according to claim 1, wherein the encapsulating resin for encapsulating the phosphor is a silicone resin.

25. A light emitting apparatus according to claim 1, wherein the light emitting control section is provided with a light receiving sensor for measuring output light from the light emitting section, and controls driving current for the plurality of light sources based on a measured value from the light receiving sensor so that a light emitting ratio for the plurality of light sources reaches a predetermined light emitting ratio.

26. A light emitting apparatus according to claim 1, wherein the light emitting control section is provided with a light receiving sensor for measuring output light from the light emitting section, and controls driving current for the plurality of light sources based on a measured value from the light receiving sensor so that light on the black body radiation locus is obtained.

27. A light emitting apparatus according to claim 1, wherein the combined light is a light that is on the black body radiation locus.

28. A light emitting apparatus according to claim 27, wherein a color temperature is adjusted along a path of the black body radiation of the light on the black body radiation locus.

29. A light emitting apparatus according to claim 1, wherein colored light other than white light is obtained as a combined light.

30. A light emitting apparatus according to claim 29, wherein the colored light is obtained in such a manner that a desired color chromaticity is adjusted by either an external operation signal or an internal control signal via the light emitting control section to actively set the light off the black body radiation locus.

31. A lighting device that uses the light emitting apparatus according to claim 1 as a light source.

32. A liquid crystal display apparatus using the light emitting apparatus according to claim 1 as a backlight.

33. The light emitting apparatus of claim 18, wherein the phosphor for a green color is further activated by Mn.

34. The light emitting apparatus of claim 19, wherein the phosphor for a green color is further activated by Mn.

* * * * *